United States Patent [19]

Nishikawa et al.

[11] Patent Number: 4,868,585

[45] Date of Patent: Sep. 19, 1989

[54] INK DOT PRINTER

[75] Inventors: Hisashi Nishikawa; Mitsuharu Endo; Masashi Shimosato; Yasunobu Terao, all of Shizuoka, Japan

[73] Assignee: Tokyo Electric Co., Ltd., Tokyo, Japan

[21] Appl. No.: 89,521

[22] Filed: Aug. 26, 1987

Related U.S. Application Data

[63] Continuation-in-part of Ser. No. 843,384, Mar. 24, 1986, abandoned.

[51] Int. Cl.[4] .......... G01D 15/16

[52] U.S. Cl. .......... 346/140 R

[58] Field of Search .......... 346/140, 75, 1.1

[56] References Cited

U.S. PATENT DOCUMENTS 2,572,549 10/1951 White .......... 346/140 X 4,710,784 12/1987 Nakayama .......... 346/140

4,768,044 8/1988 Shimosato .......... 346/140

*Primary Examiner*—Joseph W. Hartary

*Attorney, Agent, or Firm*—Oblon, Spivak, McClelland, Maier & Neustadt

[57] ABSTRACT

In an ink dot printer for forming a picture with ink by generating an electric field between a recording electrode and an opposed electrode confronting each other through a recording medium and thereby sputtering the ink from the fore end of the recording electrode toward the recording medium, the present invention employs a rod-shaped recording electrode composed of a conductive material with a multiplicity of longitudinal ink passages formed therein, hence enhancing the ink fluidity in the recording electrode to enable fast printing.

3 Claims, 5 Drawing Sheets

INK DOT PRINTER

CROSS-REFERENCE TO RELATED APPLICATION

This is a Continuation-in-Part of application U.S. Pat. No. 06/843,384 filed on Mar. 24, 1986, now abandoned.

BACKGROUND OF THE INVENTION

Field of the Invention

The present invention relates to a dot printer designed to form a picture by aggregating dots on a recording medium and, more particularly, to an ink dot printer of a type which deposits ink on a recording medium by sputtering droplets of the ink thereto through electrostatic means.

In the known ink jet printer for forming a picture on a recording medium by jetting droplets of liquid ink thereto from a nozzle, there have been contrived a variety of inventions and improvements heretofore due to some advantages including reduced printing noise and lower running cost in multicolor printing as compared with other printing systems. However, there exists a problem in practical use that no complete measure is achievable to prevent clogging of the nozzle with ink caused by the evaporation of the ink.

In an attempt to eliminate such clogging of the nozzle in the type using liquid ink, there has been developed a further improved system different from the above ink jet printer.

In some examples of such system, as disclosed in Japanese laid-open patent Nos. 56-170 and 56-4467, the nozzle prone to be clogged is replaced with a slit-like opening formed to hold the ink therein, and an electric field is applied between the opening and an opposed electrode so as to sputter the ink electrostatically. In this system, however, the structure for releasing ink droplets from the slit-like opening is delicate and lacks stability. For ensuring a stable printing operation, it is necessary to keep the slit and the recording paper in the mutual proximity with a gap of 100 to 200 microns, but the recording paper is apt to be soiled with the ink held in the slit, and simultaneously dropout of some dots is also liable to occur.

In another type, as disclosed in laid-open U.S. Pat. Nos. 54-23534 and 59-159355, magnetic ink is introduced by magnetic means to the fore end of a needle-shaped member along its periphery and then is sputtered therefrom electrostatically. However, in this type also, there exists a drawback that the use of magnetic ink diminishes the degree of freedom in selecting a desired color since the chromatic choice is restricted by the inherent ground color of the magnetic powder contained in the magnetic ink.

Under the circumstances mentioned above, the present applicants previously invented an improved ink dot printer of the type shown in FIG. 10 and filed an application for patent. In such improvement, first an ink receptacle 2 is disposed for storing ordinary liquid ink therein, and a needle-shaped recording electrode 3 of a conductive and ink-impregnable material is positioned in the ink receptacle 2 while being immersed in the ink 1 in such a manner that the fore end 4 of the recording electrode 3 projects from the ink receptacle 2. And an opposed electrode 6 is placed opposite to the fore end 4 of the recording electrode 3 through a recording paper 5. Furthermore, power sources 8 and 9 for applying a DC voltage via a switching circuit 7 are connected between the recording electrode 3 and the opposed electrode 6. And a printing controlled circuit 10 for generating a control signal in accordance with a picture signal is connected to the switching circuit 7.

The recording electrode 3 employed in the above printer consists of:

(1) a member produced by casting metallic grains while retaining air permeability therein;

(2) a member produced by sintering conductive grains such as transition metal oxide; or (3) an air-permeable foamed member molded of a conductive plastic material with carbon particles mixed therein.

Out of such three members, each of (1) and (2) is an aggregation of amorphous grains where holes are formed among them and communicate with one another three-dimensionally, and (3) also has a similar structure. Therefore the in 1 is introduced continuously to the fore end 4 of the recording electrode 3. When the switching circuit 7 is actuated in response to a picture signal, an electric field is generated between the recording electrode 3 and the opposed electrode 6 to sputter the ink 1 from the fore end 4 toward the recording paper 5. In this stage of operation, the electric field is easily concentrated on the fore end of the recording electrode 3, so that the ink 1 can be properly sputtered therefrom to stabilize the printing state. Consequently it becomes possible to dispose the recording electrode 3 and the recording paper 5 at mutually spaced positions with a sufficient clearance to eventually prevent soil of the recording paper or dropout of some dots during the printing. Furthermore, a multicolor printing mode can be effected with facility due to the nonnecessity of using any magnetic ink.

Thus the ink dot printer shown in FIG. 10 has accomplished amazing progress in the conventional technology, but in order to achieve a higher printing speed, it is necessary to further increase the amount of supplied ink 1 without the problem of dripping the ink from the fore end 4 of the recording electrode 3. In other words, the recording electrode 3 needs to be capable of holding the ink with certainty while still having a small fluid resistance.

SUMMARY OF THE INVENTION

It is a first object of the present invention to provide an ink dot printer capable of performing a fast printing operation.

A second object of the invention resides in providing an ink dot printer adapted to achieve stable printing.

A third object of the invention is to provide an ink dot printer free from a trouble of clogging with ink.

And a fourth object of the invention resides in providing an ink dot printer which is capable of effecting a multicolor printing mode without restriction in selecting the ink to be used.

For the purpose of attaining the objects mentioned above, the ink dot printer according to the present invention employs a recording electrode of a conductive material and a ink impregnability portion. Due to such a structure, the longitudinal fluidity of the ink is rendered satisfactory in the recording electrode so that a sufficient amount of the ink can be fed to the fore end of the recording electrode. In addition, there occurs no clogging of the recording electrode that results from evaporation of the ink, and multicolor printing can be accomplished with facility.

DETAILED DESCRIPTION OF THE DRAWINGS

Figure 10:
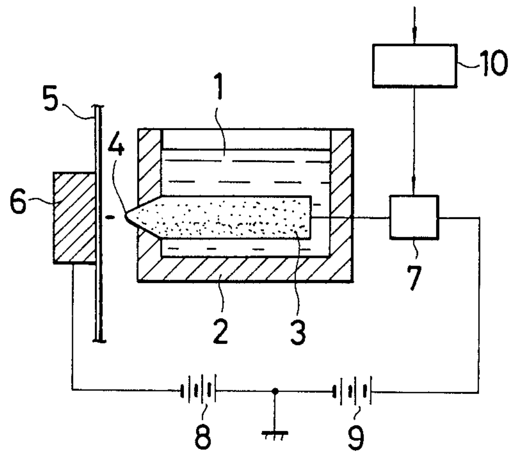
FIG. 10 is a vertical sectional side view illustrating the printing system of the invention already proposed.
Figure 11:
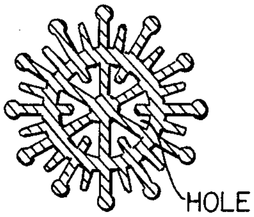
FIG. 11 is a cross section of an other embodiment of this invention.

Hereinafter a first exemplary embodiment of the present invention will be described with reference to FIGS. 1 through 5, wherein any components corresponding to those mentioned in connection with FIG. 10 are denoted by like reference numerals and a repeated explanation is omitted. (This applies also to the next and following embodiments.) In a printer 11, two guide shafts 12 are disposed horizontally in a front region thereof, and a carrier 13 is mounted on the guide shafts 12 in a manner to be reciprocable leftward and rightward. A printer head 14 is supported in the carrier 13 and, at the center of the printer 11, an opposed electrode 6 is positioned horizontally to confront the printer head 14. A tractor 15 is disposed behind the opposed electrode 6 for feeding a recording paper 5 which serves as a recording medium. And an operating knob 16 projecting outward is connected to the tractor 15.

The printer head 14 is similar to the foregoing example shown in FIG. 10, but the recording electrode 17 is structurally different therefrom as will be described later. The top of an ink receptacle 2 is covered with a printed-circuit assembly 18, and the recording electrode 17 is supported at one end of a wire 19 which is anchored firmly with electrical connection to the printed-circuit assembly 18. This assembly 18 is connected to a switching circuit 21 via a connector 20.

The recording electrode 17 consists of a member obtained by first mixing and kneading metallic grains with a binder an then extrusion-molding and sintering such a mixture. In the peripheral portions of the recording electrode 17, there are formed a multiplicity of longitudinal ink guide grooves 22 serving as ink passages. In the process of production, for example, fine grains of stainless steel are mixed and kneaded with a binder and, after the mixture is extrusion-molded and sintered, its fore end 4 is shaped to be conical. Dimensionally, the rod-like member 23 thus produced has a diameter of 0.5 mm, a radius of 0.1 mm at the fore end, and a length of 20 mm.

In another exemplary process, the metallic fine grains may be replaced with carbon particles and the mixture may be sintered by the same method as adopted for producing the lead of a pencil.

It is also effective to use a member obtained by extrusion-molding a conductive plastic material with carbon particles mixed therein and machining its fore end 4 into a desired shape.

Figure 1:
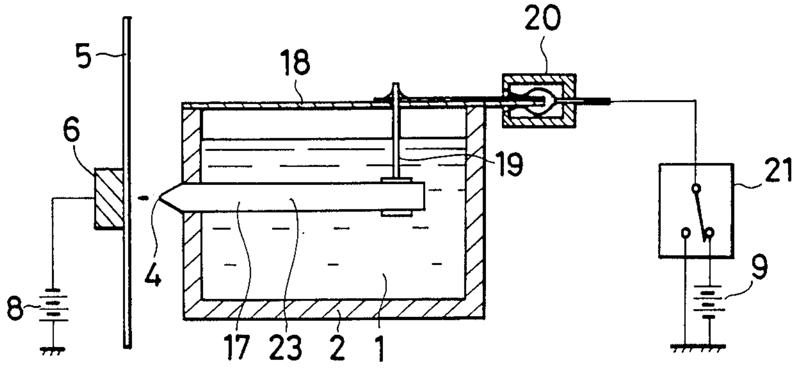
FIG. 1 is a vertical sectional side view of a first embodiment according to one embodiment of this invention.
Figure 2:
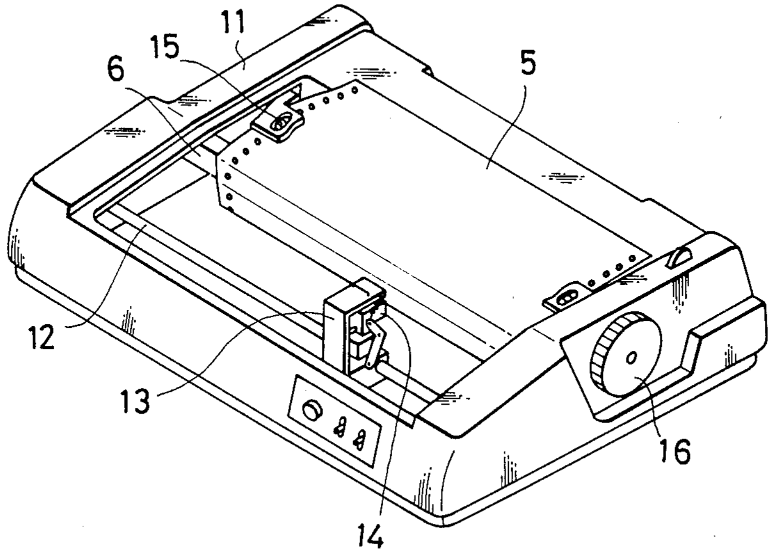
FIG. 2 is a general perspective view of a printer.
Figure 3:
FIG. 3 is a side view of a recording electrode.
Figure 4:
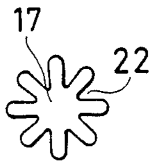
FIG. 4 is a rear view of the recording electrode.
Figure 5:
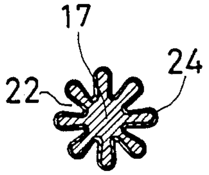
FIG. 5 is a partial sectional view of the recording electrode with a metallic thin film deposited thereon.

In the case of using a molded member of a nonconductive plastic material which is widely employed for manufacturing penpoints of writing implements, a desired recording electrode 17 can be produced at extremely low cost by depositing a metallic thin film 24 on the surface thereof to become conductive, as shown in FIG. 5.

In the structure mentioned above, a printing operation is performed in the same manner as in the foregoing example of FIG. 10, but the ink 1 is permitted to flow without resistance in the recording electrode 17 longitudinally along the guide grooves 22 formed in the peripheral portions thereof, so that a sufficient amount of the ink 1 can be supplied to the fore end 4. Consequently, even in fast printing, the ink 1 can be continuously supplied in an adequate amount to the fore end of the recording electrode 17, hence realizing a high speed in the printing operation. Furthermore, due to the existence of such ink guide grooves 22, the problem of clogging, that may otherwise be induced by evaporation of the ink 1 does not occur.

Figure 6:
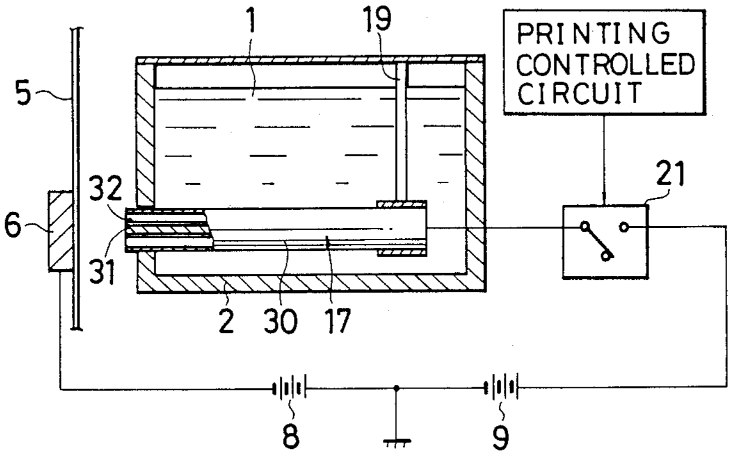
FIG. 6 is a vertical sectional side view of a second embodiment according to the invention.
Figure 7:
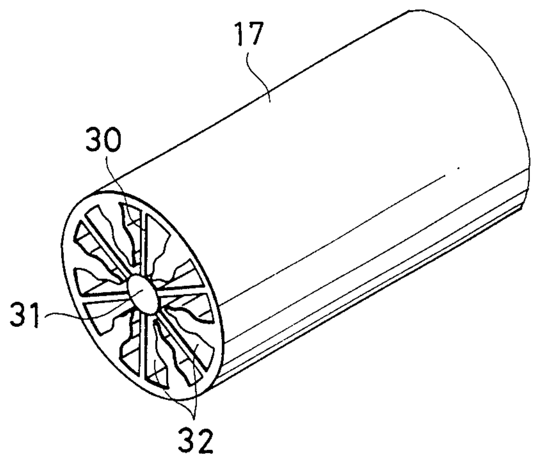
FIG. 7 is a perspective view of the recording electrode.

A second exemplary embodiment of the present invention will now e described below with reference to FIGS. 6 through 8, wherein a recording electrode 17 consists of an ink guide member 30 of an insulating material and an electrode element 31 of a conductive material. The ink guide member 30 produced by extrusion-molding a plastic material is in the shape of a rod and has a plurality of internal ink guide holes 32 communicating with the two axial ends. Meanwhile the electrode element 31 composed of a conductive material is in the shape of a wire and is inserted firmly into the center of the ink guide member 30 coaxially therewith. Such recording electrode 17 also enables a fast printing operation since the fluid resistance of the ink is small as in the first embodiment.

Figure 8:
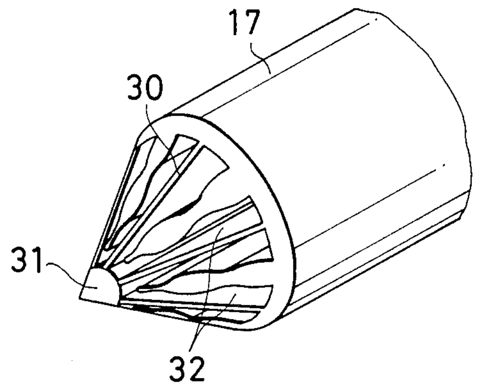
FIG. 8 is a perspective view of a modification of FIG. 7.

FIG. 8 shows a modified recording electrode 17 whose fore end is tapered so as to induce easy concentration of an electric field thereon.

Figure 9:
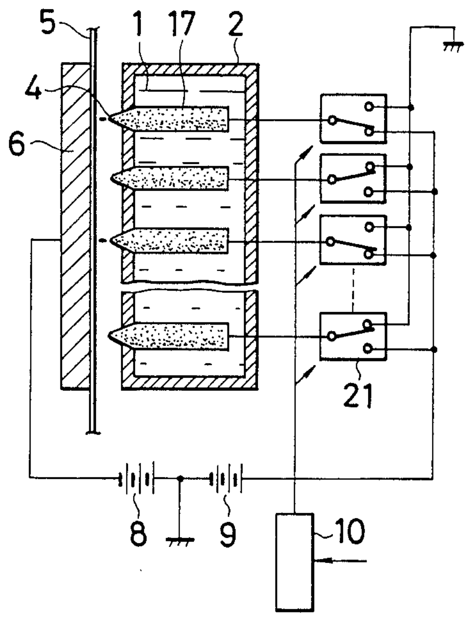
FIG. 9 is a vertical sectional side view of a third embodiment according to the invention.

In a third embodiment of the present invention shown in FIG. 9, a multiplicity of recording electrodes 17 are disposed in parallel with one another. In this arrangement, independent switching circuits 7 are connected to the individual recording electrodes 17 respectively, and a switching action is executed by a printing controlled circuit 10 in accordance with picture signal.

Since the above-described recording electrode 17 is producible at extremely low cost, the printer head 14 may be formed into a replaceable unit to be discarded after complete use of the ink 1 contained in the receptacle 2.

Figure 12:
FIGS. 12 and 13 are a side view and a cross sectional view respectively of an other embodiment of the electrode according to this invention.
Figure 13:

In the embodiments shown in FIGS. 11 through 15 an electrode is provided which is electrically conductive and which is impregnable to ink. One electrode is shown in cross section in FIG. 11. Another electrode is shown in FIGS. 12 and 13 which consists of a larger number of electrically conductive wires. This gathering of wires is impregnable to ink.

Figure 14:
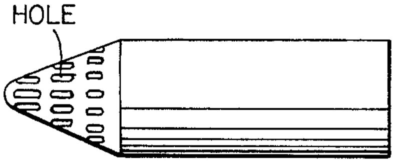
FIGS. 14 and 15 are a side view and a cross sectional view respectively of yet another embodiment of this invention.
Figure 15:
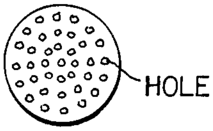

An additional embodiment is shown in FIGS. 14 and 15 which has a large number of holes formed longitudinally therein and where the material which forms the electrode is electrically conductive and impregnable to ink.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An ink dot printer wherein a recording electrode fed with ink at the fore end thereof and an opposed electrode are so positioned as to confront each other through a recording medium, and a picture formed on said recording medium with the ink sputtered thereto from the fore end of said recording electrode by generating an electric field between said recording electrode and opposed electrode, said ink dot printer characterized in that said recording electrode consist of a rod-shaped member of a conductive material that is impregnable to ink with a multitude of internal ink guide holes being formed along the longitudinal direction of said conductive member.

2. An ink dot printer wherein a recording electrode fed with ink at the fore end thereof and an opposed electrode are so positioned as to confront each other through a recording medium, and a picture is formed on said recording medium with the ink sputtered thereto from the fore end of said recording electrode by generating an electric field between said recording electrode and opposed electrode, said ink dot printer characterized in that said recording electrode consists of a rod-shaped member that is impregnable to ink wherein said rod-shaped member is composed of an insulating material and has a plurality of internal ink guide holes communicating with the two ends thereof, and a wire-shaped electrode element positioned longitudinally at the center of said ink guide member.

3. The ink dot printer as defined in claim 1, wherein the fore end of said recording electrode is shaped to be conical.

* * * * *